United States Patent
Lindby

(10) Patent No.: US 6,981,713 B2
(45) Date of Patent: Jan. 3, 2006

(54) MOTORCYCLE ENGINE GUARD WITH RETRACTABLE FOOTRESTS

(76) Inventor: Per Lindby, 320 E. Crowther Ave., Placentia, CA (US) 92870

( * ) Notice: Subject to any disclaimer, the term of this patent is extended or adjusted under 35 U.S.C. 154(b) by 0 days.

(21) Appl. No.: 10/777,527

(22) Filed: Feb. 12, 2004

(65) Prior Publication Data

US 2005/0178595 A1    Aug. 18, 2005

(51) Int. Cl.
*B62J 25/00*    (2006.01)
*B62J 27/00*    (2006.01)

(52) U.S. Cl. .................. 280/291; 280/304.3; 74/564; 293/105

(58) Field of Classification Search ............ 280/291, 280/304.3–304.5, 160.1, 384; 74/284, 564; 180/219, 90.6; 297/423.25, 423.26, 423.28, 297/423.35, 423.33; 293/105; 296/75, 78.1; 362/475, 476, 523
See application file for complete search history.

(56) References Cited

U.S. PATENT DOCUMENTS

| | | | |
|---|---|---|---|
| 1,941,801 A * | 1/1934 | Harley | ............. 280/304.3 |
| 4,171,823 A | 10/1979 | Nemes | |
| D270,527 S * | 9/1983 | O'Rourke | ............. D12/114 |
| 4,456,090 A | 6/1984 | Malenotti | |
| 4,771,651 A * | 9/1988 | Haro | ............. 74/564 |
| 4,852,900 A * | 8/1989 | Nahachewski | ............. 280/291 |
| 4,925,231 A | 5/1990 | Hamaguchi | |
| D361,311 S * | 8/1995 | Lindby | ............. D12/126 |
| 5,454,580 A * | 10/1995 | Lin | ............. 280/291 |
| 6,068,075 A * | 5/2000 | Saiki | ............. 180/219 |
| 6,142,499 A * | 11/2000 | Hsieh et al. | ............. 280/291 |
| 6,173,983 B1 | 1/2001 | Moore | |
| 6,354,723 B1 | 3/2002 | Spence | |
| D484,074 S * | 12/2003 | Henneberry | ............. D12/114 |
| 6,758,484 B1 * | 7/2004 | Rice | ............. 280/304.4 |
| 2002/0158441 A1 | 10/2002 | Essinger | |
| 2005/0116443 A1 * | 6/2005 | Egan | ............. 280/291 |

* cited by examiner

*Primary Examiner*—Annne Marie Boehler
(74) *Attorney, Agent, or Firm*—Raymond Sun

(57) ABSTRACT

The invention herein described is a motorcycle guard with retractable footrests. The guard is mounted to the outside of the engine of a motorcycle. The footrests are extended for use, and retracted when no longer needed. A mechanism is installed to prevent over-extension of the footrests.

9 Claims, 4 Drawing Sheets

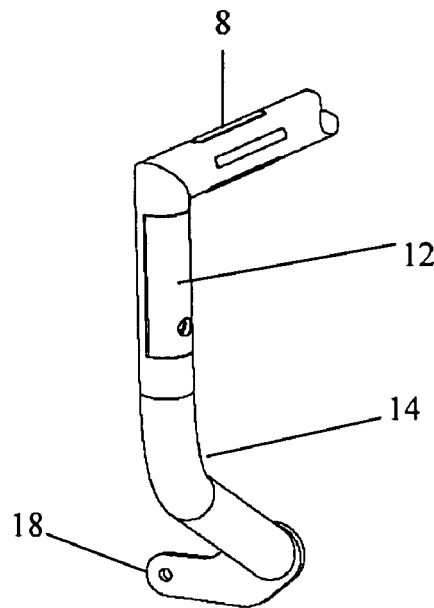
_Fig. 8_
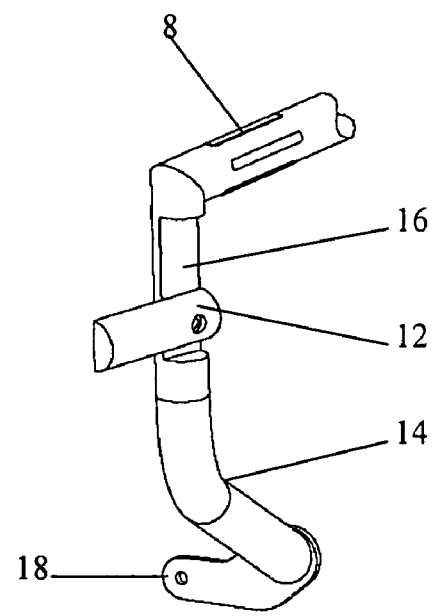
_Fig. 9_
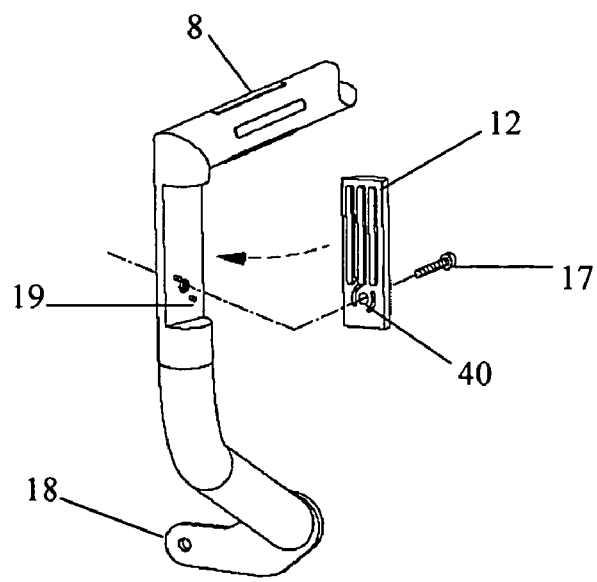
_Fig. 10_

MOTORCYCLE ENGINE GUARD WITH RETRACTABLE FOOTRESTS

CROSS-REFERENCE TO PRIOR APPLICATIONS

This application describes the invention portrayed in design patent application Ser. No.29/193,547 filed on Nov. 11, 2003.

FIELD OF THE INVENTION

This invention relates to motorcycle accessories, and more particularly to engine guards with retractable footrests.

DESCRIPTION OF THE PRIOR ART

The engine on a motorcycle is commonly placed toward the front of the vehicle, behind the front wheel struts and forward of the seat. Motorcycle engines are typically uncovered along the sides, and therefore exposed to possible damage. Most manufacturers provide a bar or other guard to lessen the risk of damage, but such bars or guards are not attractive, are inconvenient for the placement of the rider's legs and feet, and are placed or shaped in such a way as to fail to adequately protect against damage from the side.

Some prior art teaches engine guards that combine with other functions for comfort of the operator. For example, U.S. Pat. No. 4,925,231 issued on May 15, 1990 to inventor K. Hamaguchi of Tokyo, Japan displays an engine guard that also serves as an air-conducting pipe. There remains a need for an engine guard that is attractive and yet strong so that it does not collapse or bend from the weight of a bike on its side. Such a guard must protrude out from the side of the bike by a sufficient distance as to reduce or completely eliminate side damage.

Prior art has developed many types of footrests for motorcycle operators and passengers. These footrests have been added to various places on bikes. Some are adjustable while others are stable. Examples include U.S. Pat. No. 6,354,723 issued on Mar. 12, 2002 to inventor W. L. Spence (describing a motorcycle footrest with a light inside); U.S. Pat. No. 6,173,983 issued on Jan. 16, 2001 to inventor T. L. Moore (displaying a set of otherwise conventional motorcycle footrests that have unusual mounting brackets); U.S. Pat. No. 4,456,090 issued on Jun. 26, 1984 to inventor F. Malenotti of Rome, Italy (adjustable motorcycle footrest); U.S. Pat. No. 4,171,823 issued on Oct. 23, 1979 to inventor S. Nemes (a motorcycle locking bar that doubles as a footrest); U.S. Pat. No. 4,030,561 issued on Jun. 21, 1977 to inventors Hashimoto and Shako (a motorcycle footrest that pivots); U.S. 2002/0158441 is a published patent application of inventor M. Esssinger, published on Oct. 31, 2002 (a dual eccentric adjustable motorcycle footrest); German patent DE 19,511,760 to inventor K. Vosteen (an adjustable cantilevered footrest useable by a passenger on a motorcycle).

The difficulty with the prior art is that it requires additional parts and accessories to be added to a motorcycle. Most cycle operators would prefer to have several footrests available so they can change leg positions for comfort during their ride. However, the more parts that are added to a cycle, the more weight the cycle must carry with some resulting decrease in performance, plus the more parts there are subject to deterioration and breakage.

There is thus a need for motorcycle accessories that can serve a dual purpose as a footrest for the operator while serving in their primary function.

SUMMARY OF THE PRESENT INVENTION

The present invention provides a strong engine guard of forged steel that protrudes from the side of a motorcycle immediately in front of the engine and behind the front wheel strut. This guard is designed to not bend or collapse, and to protect each side of the 'cycle engine. In addition, the present invention is specially designed to serve as a footrest for the operator in two places. First, friction strips are imbedded or attached to the guard on either side in the protruding area most convenient for the operator's feet placement. Second, a foot peg is provided on each side, which pegs are flattened on the side facing the driver and may be pivotable from the engine guard such that the operator has the option of extending the pegs or folding them into the guard. The shape of the engine guard has been specially designed to be attractive to the operator, and the engine guard is chrome-coated.

An object of the present invention is to provide an engine guard for a motorcycle.

Another object of the present invention is to provide an engine guard that is strong enough to resist bending or collapsing under the weight of the motorcycle in a slip or fall, or in an accident.

Still another object of the present invention is to provide an engine guard that will help protect the motorcycle engine and body from scratches and dents when the motorcycle is laid on its side.

Yet another object of the present invention is to provide an embodiment of the invention that will enhance the visual appearance of the motorcycle.

A further object of the present invention is to provide two footrests in two different locations for the comfort of the operator.

A further object of the present invention is to provide footrests that can be closed up to the bar of the engine guard to retain the integrity of the shape of the bar, and keep it attractive to operators and onlookers.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 8 shows in cutaway detail a section of the right side leg of the present invention, with retractable footrest retracted, in stowed position, from a perspective view.

FIG. 9 shows in cutaway detail a section of the right side leg of the present invention, with retractable footrest in extended position, from the same perspective view as in FIG. 8.

FIG. 10 shows in cutaway detail a section of the right side leg of the present invention, with retractable footrest detached to show detail, from the same perspective view as in FIG. 8.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as representative basis for teaching one skilled in the art to employ the present invention in virtually any appropriately detailed system, structure, or manner. The drawings constitute a part of this specification and include exemplary embodiments to the invention, which may be embodied in various forms. It is to be understood that in some instances various aspects of the invention may be shown exaggerated or enlarged to facilitate an understanding of the invention.

Figure 1:
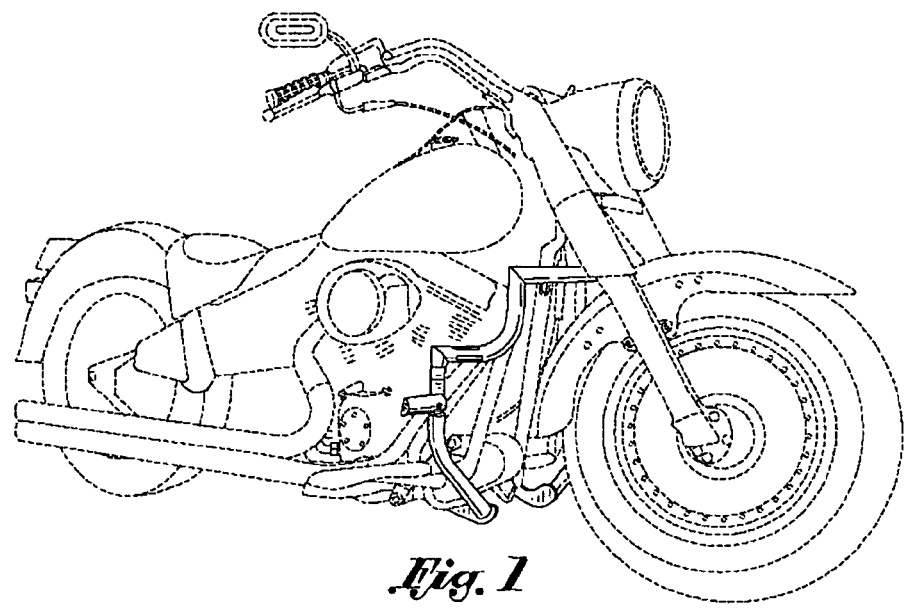
FIG. 1 shows a perspective view of a preferred embodiment of the present invention as attached to a motorcycle. The motorcycle itself is not part of the current invention, and is therefore illustrated in broken lines.

FIG. 1 shows a perspective view of a preferred embodiment of the present invention 100 as attached to a motorcycle. The motorcycle itself is not part of the current invention, and is therefore illustrated in broken lines. Only one side of the present invention 100 is visible in this perspective view because the invention is attached so that it crosses from one side of the motorcycle to the other immediately in front of the engine but behind the front-wheel struts. The present invention will extend out from each side of the motorcycle approximately 6 to 12 inches, and the pivotal footrest can be further extended to a 90-degree angle from the vertical bar of the engine guard by another four to six inches.

Figure 2:
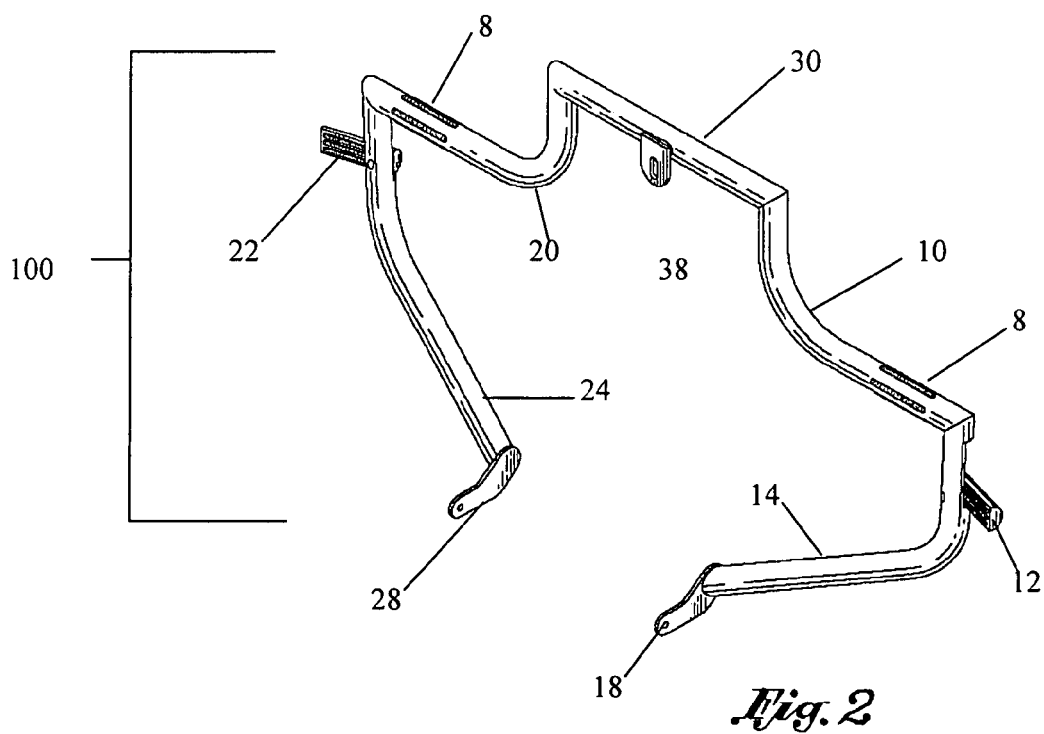
FIG. 2 displays a preferred embodiment of the present invention, dismounted from a motorcycle, in a perspective view from above and to the side.

FIG. 2 displays a preferred embodiment of the present invention, dismounted from a motorcycle, in a perspective view from above and to the side. The bar of the guard 30 is seen to have a horizontal center piece that is attached by welding to a curved piece 10 on either side. On this curved piece, strips have been machined into the bar 8 and are filled with a friction-creating material, such as rubber. This creates a footrest on the outer end of each curved piece of the engine guard at the area where the guard will protrude from the side of the bike when mounted on it. To each of the first curved pieces on either side 10, two other curved pieces 14 and 24 are welded in a vertical position, with the curved sections facing inwards towards each other. When mounted, these second curved sections extend toward the motorcycle and are attached by a left and right bracket 18 and 28 to the bike frame near the lower part of the engine. The engine guard is secured to the bike frame near the top of the engine by a bracket 38 welded to the horizontal center piece of the guard. On the vertical pieces 14 and 24, left and right retractable footrests 12 and 22 are provided, each of which can be pivoted up to a 90-degree angle from the bar. This footrest is further described in detail in FIGS. 8, 9, and 10.

Figure 3:
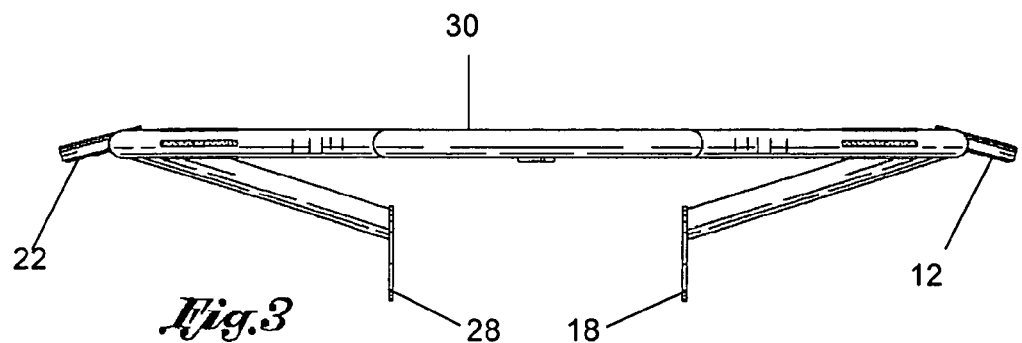
FIG. 3 shows a preferred embodiment of the present invention from a top view, much as a motorcycle rider would view it (provided the motorcycle itself were transparent).
Figure 5:
FIG. 5 displays a preferred embodiment of the present invention from a bottom view.

FIG. 3 shows a preferred embodiment of the present invention from a top view, much as a motorcycle rider would view it (if the motorcycle itself were transparent). FIG. 5 displays a preferred embodiment of the present invention from the corresponding bottom view.

Figure 4:
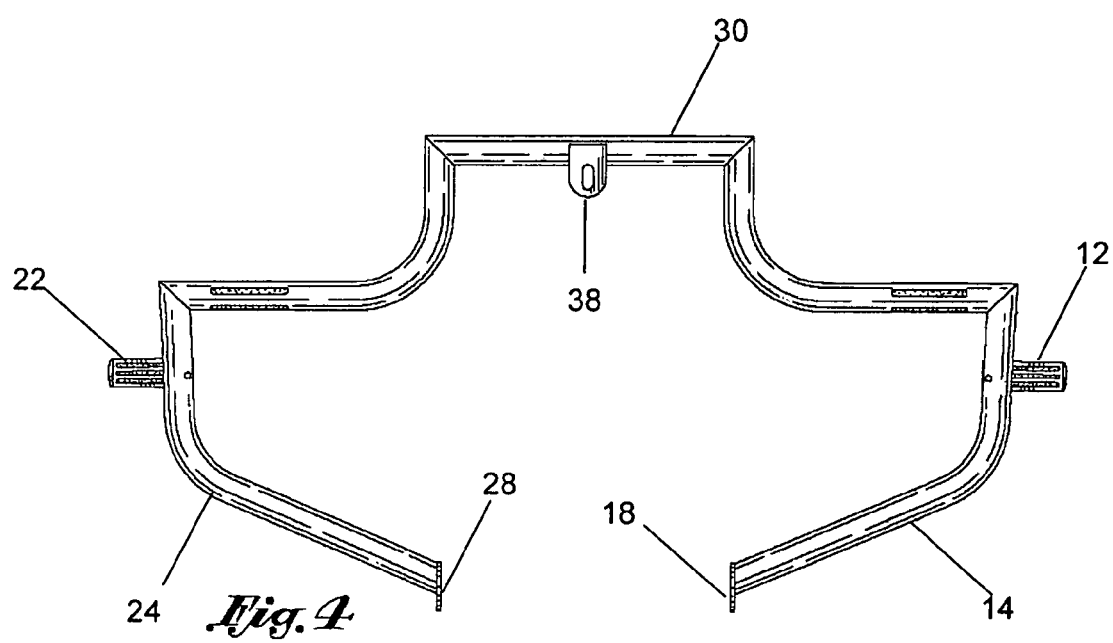
FIG. 4 shows a preferred embodiment of the present invention from the front of the guard in a full plan view, the front being the side of the mounted guard that faces toward the operator of the cycle.

FIG. 4 shows a preferred embodiment of the present invention from a full plan view. This shows to advantage the substantial U shape of the tubular pipe, the sections of welded pipes (8, 10, 14, 24, and 30) that comprise the entire tubular pipe, and the footrests 12 and 22, here shown in extended position. The motorcycle engine can fit substantially within the area circumscribed by the tubular pipe, although as displayed in FIG. 1, the present invention is preferably mounted slightly in front of the midsection of the motorcycle engine.

Figure 7:
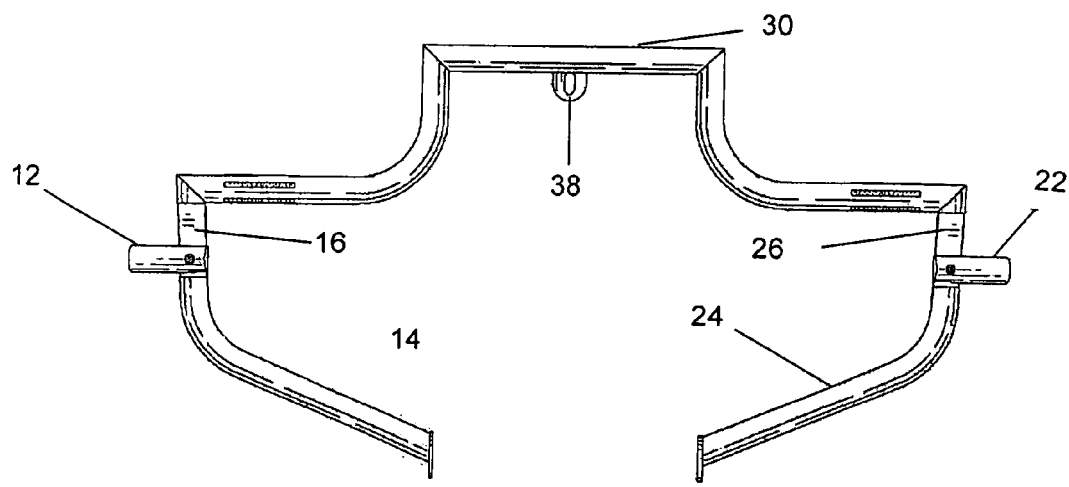
FIG. 7 shows a preferred embodiment of the present invention from reverse plan view, of the opposite side from that seen in FIG. 4.

FIG. 7 simply shows a preferred embodiment of the present invention from reverse plan view, of the opposite side from that seen in FIG. 4. The advantage of this view is that the flat half-panels that form cutout areas 16 and 26 are shown. These cutout areas, not visible form the view of FIG. 4, are where the footrests 12 and 22 rest when in retracted position.

Footrests 12 and 22 essentially comprise sections of tubular pipe that have been sliced horizontally in half, then cut out from the main section of pipe, and filled in to form a flat surface on the cut face. Cutout areas 16 and 26 are filled in the same manner to form flat surfaces. Thus, when footrests 12 and 22 are retracted, they are pivoted 90° to align with the main section of pipe. Except for seams, the resulting pipe looks essentially as if no footrests were attached.

Figure 6:
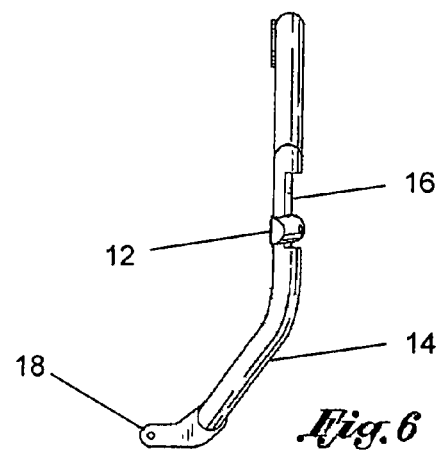
FIG. 6 shows in cutaway detail a section of the right vertical side leg of the present invention, with retractable footrest extended, viewed from the side.

FIG. 6 shows in cutaway detail a section of the right side leg of the present invention, with retractable footrest extended, viewed from the side. From this view, it can be seen that footrest 12 is shaped in the form of a half circle, with a flat edge and a semicircular edge.

Footrest 22 (not shown in this Figure) has the same shape. This allows the footrests to fit snugly within cutout areas 16 and 26.

FIG. 8 shows in cutaway detail a section of the right side leg of the present invention, with retractable footrest retracted, in stowed position, from a perspective view. This demonstrates the snug fit described above. Correspondingly, FIG. 9 shows in cutaway detail a section of the right side leg of the present invention, with retractable footrest in extended position, from the same perspective view as in FIG. 8.

FIG. 10 shows in cutaway detail a section of the right side leg of the present invention, with retractable footrest detached to show detail, from the same perspective view as in FIG. 8. This allows description of the footrest extension and retraction mechanism. The description is applied directly to right footrest 12, but it applies as well to left footrest 22.

Near the bottom of footrest 12 is drilled a hole, through which is inserted a pivot pin 17. Pivot pin 17 further extends through a hole in the flat area facing cutout area 16. The footrest can pivot around this pivot pin to reach the extended and the retracted positions.

Aside the hole in footrest 12 is cut a curved slot 40 in the flat surface. Slot 40 is mated to a metal pin 19 protruding from the flat surface 16. Slot 40 extends over an arc of a quarter circle, or 90°. The metal pin 19 fits snugly in the curved slot 40 at all times when the present invention is in operation. The pin 19 prevents the footrest from over-traversing beyond the desired 90° extended position shown in FIG. 9, by causing the footrest travel to stop when the end of the curved slot 40 is reached. Similarly, the traverse of the footrest in the opposite direction is arrested when pin 19 again reaches the end of curved slot 40. In this manner, the footrest comes to a stop at the retracted position shown in FIG. 8.

While the invention has been described in connection with a preferred embodiment or embodiments, it is not intended to limit the scope of the invention to the particular form set forth, but on the contrary, it is intended to cover such alternatives, modifications, and equivalents as may be included within the spirit and scope of the invention as defined by the appended claims.

I claim:

1. A motorcycle engine guard, comprising:
   a bar having a sufficient length to surround the engine of a motorcycle, the bar having a first side that extends from the bottom of the engine on one side of the engine to the top of the engine, and a second side that extends from the bottom of an opposite side of the engine to the top of the engine;
   a cut-out region formed in the first side of the bar; and
   a footrest pivotably coupled to the cut-out region, and fitted inside the cut-out region when the footrest is not in use.

2. The guard of claim 1, wherein the bar is shaped as an inverted U, with a flattened top.

3. The guard of claim 1, wherein the footrest is aligned with the remainder of the first side of the bar when the footrest is fitted inside the cut-out region.

4. The guard of claim 1, wherein the footrest has a semicircular cross-section with a flat edge and a semicircular edge.

5. The guard of claim 1, further including a pin that pivotably couples the footrest to the cut-out region.

6. The guard of claim 1, further including means for coupling the footrest to the cut-out region.

7. The guard of claim 1, further including:
   a slot provided on the footrest; and
   a pin extending from the cut-out region and disposed inside the slot, with the slot defining the limits of the pivoting motion of the footrest.

8. The guard of claim 1, further including means for limiting the pivoting motion of the footrest.

9. The guard of claim 1, wherein the cut-out region is a first cut-out region, and the footrest is a first footrest, the guard further including:
   a second cut-out region formed in the second side of the bar; and
   a second footrest pivotably coupled to the second cut-out region.

* * * * *